US010720671B2

(12) United States Patent
Umeyama et al.

(10) Patent No.: US 10,720,671 B2
(45) Date of Patent: Jul. 21, 2020

(54) NONAQUEOUS ELECTROLYTE SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventors: Hiroya Umeyama, Okazaki (JP); Yukiyoshi Ueno, Gotenba (JP); Kaoru Inoue, Hirakata (JP); Hideki Sano, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 15/531,265

(22) PCT Filed: Nov. 20, 2015

(86) PCT No.: PCT/IB2015/002193
§ 371 (c)(1),
(2) Date: May 26, 2017

(87) PCT Pub. No.: WO2016/083878
PCT Pub. Date: Jun. 2, 2016

(65) Prior Publication Data
US 2017/0346138 A1    Nov. 30, 2017

(30) Foreign Application Priority Data
Nov. 28, 2014   (JP) .................. 2014-241757

(51) Int. Cl.
*H01M 10/0587* (2010.01)
*H01M 10/04* (2006.01)
*H01M 10/0525* (2010.01)

(52) U.S. Cl.
CPC ... *H01M 10/0587* (2013.01); *H01M 10/0431* (2013.01); *H01M 10/0525* (2013.01)

(58) Field of Classification Search
CPC ......... H01M 10/0587; H01M 10/0431; H01M 10/0525; H01M 2/263
See application file for complete search history.

(56) References Cited

U.S. PATENT DOCUMENTS

2007/0196730 A1* 8/2007 Kozuki ............... H01M 2/0225
429/161
2008/0076013 A1    3/2008 Wu
2015/0263376 A1    9/2015 Kondo et al.

FOREIGN PATENT DOCUMENTS

CN       2598160 Y      1/2004
CN     101026248 A      8/2007
(Continued)

OTHER PUBLICATIONS

Feb. 6, 2016 Written Opinion issued in International Patent Application No. PCT/IB2015/002193.

*Primary Examiner* — Magali P Slawski
*Assistant Examiner* — Kourtney R S Carlson
(74) *Attorney, Agent, or Firm* — Oliff PLC

(57) ABSTRACT

A nonaqueous electrolyte secondary battery includes a wound electrode assembly in which a positive electrode having, at its one end in a width direction, a positive electrode exposed portion provided without a positive electrode mixture layer on a positive electrode current collector and a negative electrode are wound together, with a separator interposed therebetween. The positive electrode exposed portion protrudes outward in an axial direction of the wound electrode assembly relative to the separator and the negative electrode at one end in the axial direction of the wound electrode assembly. The negative electrode exposed portion protrudes outward in the axial direction of the wound electrode assembly relative to the separator and the positive electrode at the other end in the axial direction. The positive electrode exposed portion has a cutout portion at (Continued)

least in an outermost circumferential portion of the positive electrode.

7 Claims, 8 Drawing Sheets

(56) References Cited

FOREIGN PATENT DOCUMENTS

| | | |
|---|---|---|
| DE | 202006011609 U1 | 9/2006 |
| JP | H09-092250 A | 4/1997 |
| JP | H11-219694 A | 8/1999 |
| JP | H11-339756 A | 12/1999 |
| JP | 2002-008710 A | 1/2002 |
| JP | 2004-241149 A | 8/2004 |
| JP | 2007-227137 A | 9/2007 |
| JP | 2009-289672 | 12/2009 |
| JP | 2014-035877 A | 2/2014 |

* cited by examiner

WIDTH DIRECTION OF POSITIVE ELECTRODE

WIDTH DIRECTION OF POSITIVE ELECTRODE

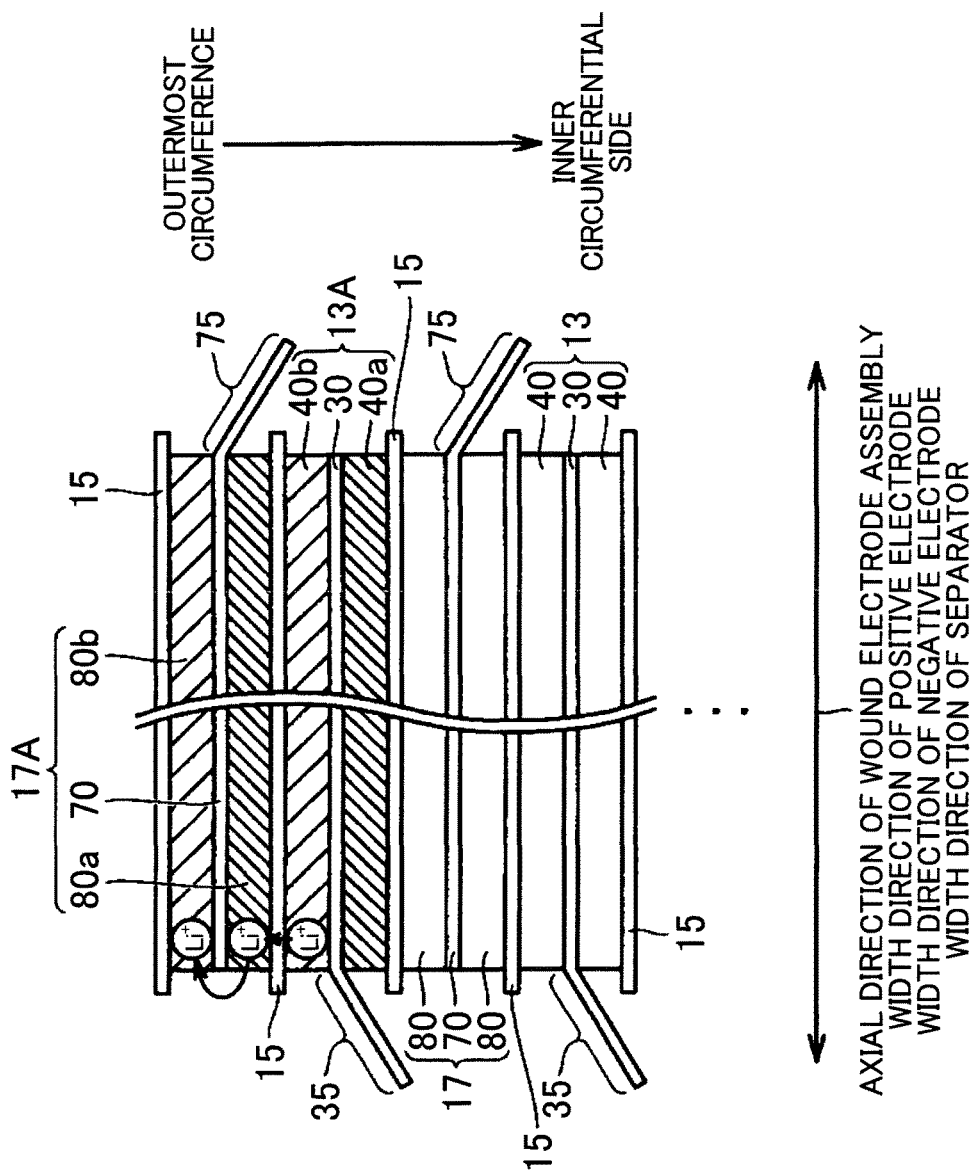

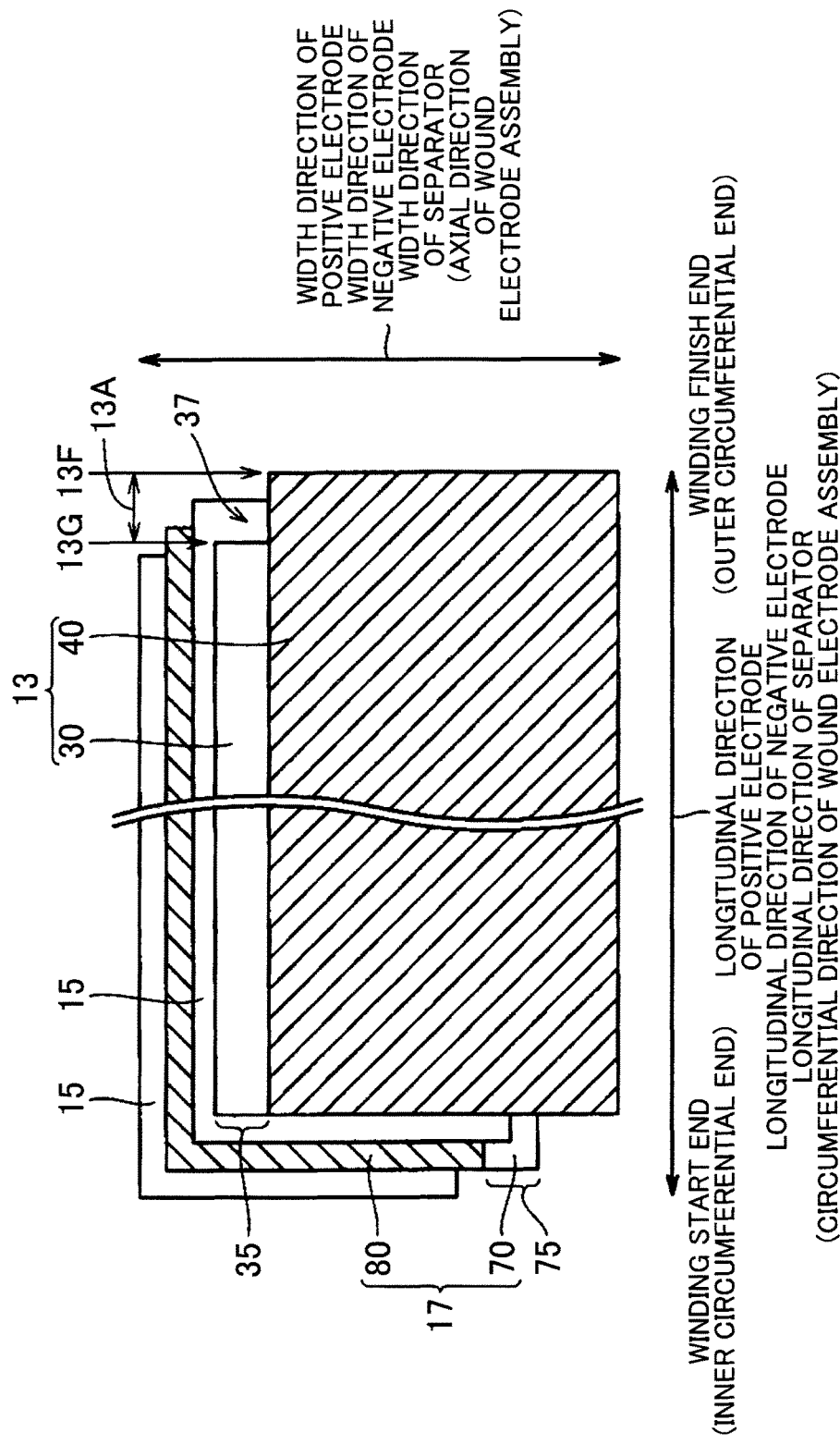

NONAQUEOUS ELECTROLYTE SECONDARY BATTERY AND METHOD OF MANUFACTURING THE SAME

BACKGROUND OF THE INVENTION

1. Field of the Invention

The invention relates to a nonaqueous electrolyte secondary battery and a method of manufacturing the same.

2. Description of Related Art

Japanese Patent Application Publication No. 2014-035877 (JP 2014-035877 A) describes that if a positive electrode mixture layer is not provided on at least an outer circumferential side surface of the surfaces of a positive electrode current collector on the outermost circumference of a positive electrode, it is possible to prevent the occurrence of a micro short circuit due to aging treatment at a high temperature of 60° C. or more.

In nonaqueous electrolyte secondary batteries for use as power sources of consumer electronic devices (hereinafter referred to as "consumer nonaqueous electrolyte secondary batteries"), there are cases where a mixture layer is not provided on a current collector on the outermost circumference of a wound electrode assembly for the purpose of increasing the battery capacity and for the purpose of enhancing the safety. Such an electrode is produced, for example, by a method of applying a mixture paste to a surface of the current collector using an intermittent coating system. Here, the consumer electronic devices include hand-held devices such as cellular phones (cellular phones include smartphones) and PDAs (Personal Digital Assistants or Personal Data Assistants), and PCs (Personal Computers).

In recent years, it has been considered to use nonaqueous electrolyte secondary batteries as vehicular power sources (e.g. power sources for automobiles such as hybrid cars, electric cars, and so on), power sources for factories, household power sources, and so on. In such nonaqueous electrolyte secondary batteries (hereinafter may be referred to as "large nonaqueous electrolyte secondary batteries"), the number of turns of electrodes in a wound electrode assembly is large compared to the consumer nonaqueous electrolyte secondary batteries. For example, each of positive and negative electrodes is wound in 13 turns or more and 17 turns or less in a wound electrode assembly of a consumer nonaqueous electrolyte secondary battery, whereas each of positive and negative electrodes is wound in 20 turns or more and 50 turns or less in a wound electrode assembly of a large nonaqueous electrolyte secondary battery. Accordingly, the circumferential difference between the positive electrode and the negative electrode becomes large. Hence, it is difficult to specify a portion that will be on the outermost circumference, in the electrode before winding (the beltlike electrode) and, therefore, it is difficult to apply the structure of the consumer nonaqueous electrolyte secondary battery (the structure in which a mixture layer is not provided on a current collector on the outermost circumference of a wound electrode assembly) to the large nonaqueous electrolyte secondary battery. Consequently, in the large nonaqueous electrolyte secondary battery, the safety is ensured by preventing the positive electrode from facing the outermost circumference of the negative electrode.

SUMMARY OF THE INVENTION

However, this time, it has been found that when a large nonaqueous electrolyte secondary battery is stored in a charged state in a high-temperature environment, the performance of such a nonaqueous electrolyte secondary battery is reduced. The invention keeps the performance of a nonaqueous electrolyte secondary battery high even if the nonaqueous electrolyte secondary battery is stored in a charged state in a high-temperature environment.

A nonaqueous electrolyte secondary battery of the invention includes a wound electrode assembly in which a positive electrode having, at one end in a width direction of the positive electrode, a positive electrode exposed portion provided without a positive electrode mixture layer on a positive electrode current collector and a negative electrode having, at one end in a width direction of the negative electrode, a negative electrode exposed portion provided without a negative electrode mixture layer on a negative electrode current collector are wound together, with a separator interposed therebetween. The positive electrode exposed portion protrudes outward in an axial direction of the wound electrode assembly relative to the separator and the negative electrode at one end in the axial direction of the wound electrode assembly. The negative electrode exposed portion protrudes outward in the axial direction of the wound electrode assembly relative to the separator and the positive electrode at the other end in the axial direction of the wound electrode assembly. The positive electrode exposed portion has a cutout portion at least in an outermost circumferential portion of the positive electrode.

Even if the nonaqueous electrolyte secondary battery of the invention is stored in a charged state in a high-temperature environment, it is possible to prevent that the movement of lithium ions from a positive electrode mixture layer, located on the inner circumferential side of the wound electrode assembly, of the positive electrode mixture layers provided in the outermost circumferential portion of the positive electrode to a negative electrode mixture layer provided in an outermost circumferential portion of the negative electrode is precluded by the positive electrode exposed portion. Accordingly, it is possible to prevent the potential of the positive electrode from becoming locally high in the outermost circumferential portion of the positive electrode.

As a method of manufacturing the nonaqueous electrolyte secondary battery of the invention, there can be cited, for example, a method of winding together the positive electrode, the negative electrode, and the separator in such a way that one end side in a longitudinal direction of the positive electrode, where the cutout portion is formed, serves as a winding finish end, while the other end side in the longitudinal direction of the positive electrode serves as a winding start end.

Here, "a width direction of the positive electrode" means a direction perpendicular to both a thickness direction of the positive electrode and a longitudinal direction of the positive electrode. "a thickness direction of the positive electrode" means a direction perpendicular to surfaces of the positive electrode current collector on which the positive electrode mixture layers are provided. "a longitudinal direction of the positive electrode" means a longitudinal direction of the positive electrode in a non-wound state. These also apply to "a width direction of the negative electrode", "a thickness direction of the negative electrode", and "a longitudinal direction of the negative electrode". "an axial direction of the wound electrode assembly" means a direction parallel to the width direction of the positive electrode and the width direction of the negative electrode.

In the invention, even if the nonaqueous electrolyte secondary battery is stored in a charged state in a high-temperature environment, the performance of the nonaqueous electrolyte secondary battery can be kept high.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a cross-sectional view showing a main part of a wound electrode assembly of a conventional large nonaqueous electrolyte secondary battery;

FIG. 7 is a plan view showing a process of a manufacturing method of the nonaqueous electrolyte secondary battery of the embodiment of the invention.

DETAILED DESCRIPTION OF EMBODIMENTS

Figure 1:
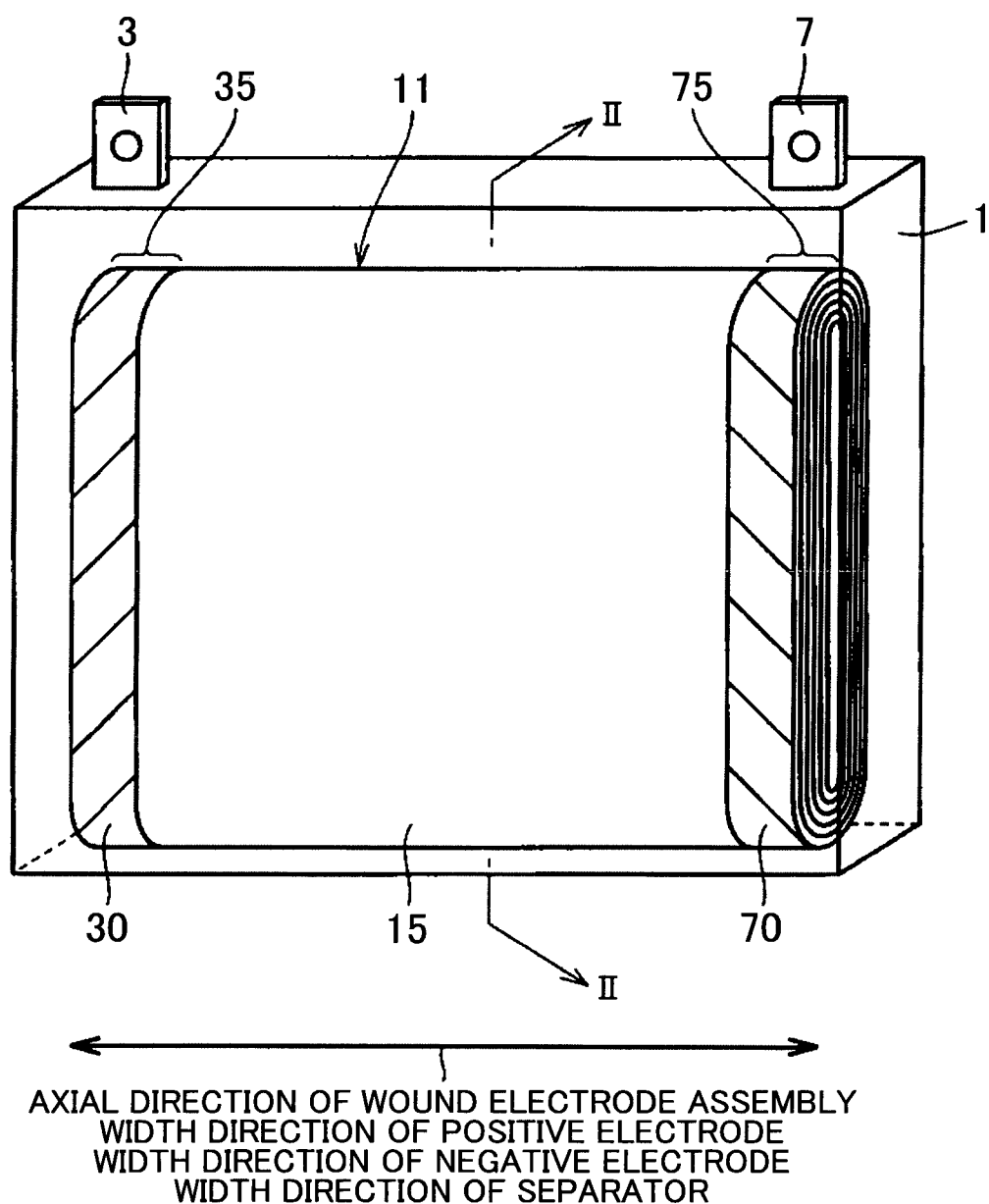
FIG. 1 is a perspective view showing a main part of a nonaqueous electrolyte secondary battery of an embodiment of the invention.

Hereinbelow, the invention will be described with reference to the drawings. In the drawings of the invention, the same reference symbols denote the same or corresponding portions. The dimensional relationship between length, width, thickness, depth, and so on is changed as appropriate for clarification and simplification of the drawings and does not show the actual dimensional relationship.

Figure 2:
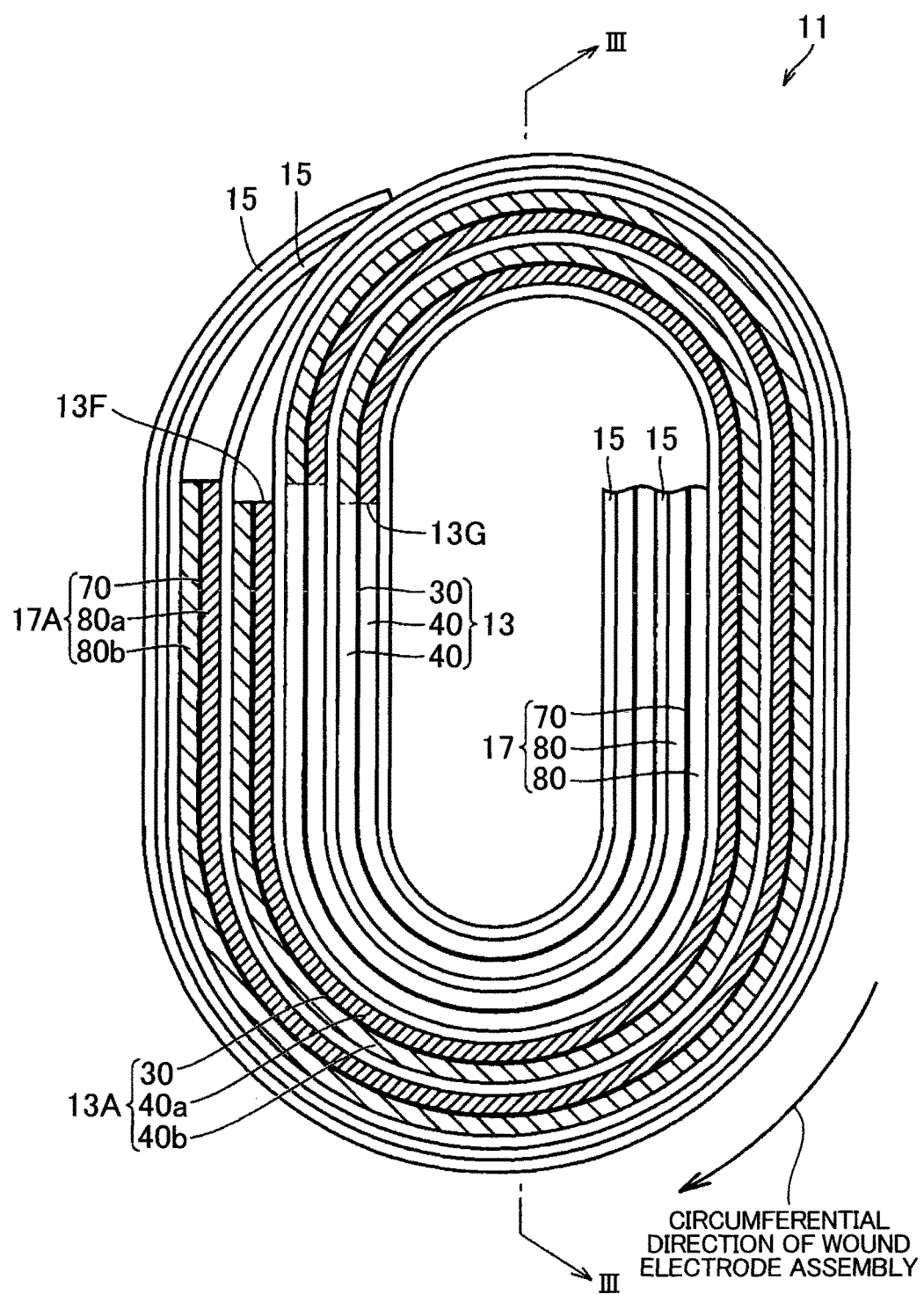
FIG. 2 is a cross-sectional view showing a main part of a cross section taken along line II-II of FIG. 1.
Figure 3:
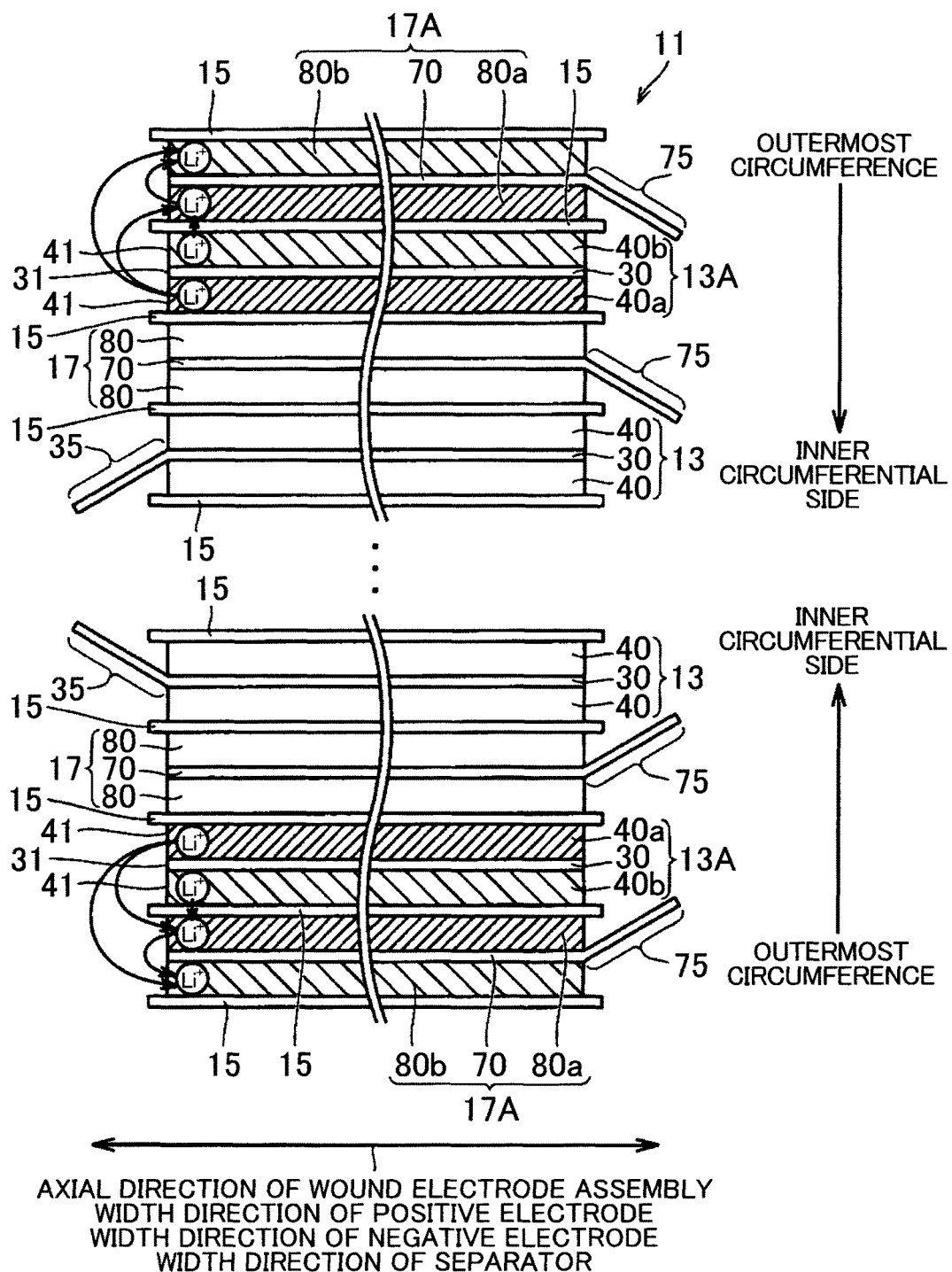
FIG. 3 is a cross-sectional view showing a main part of a cross section taken along line of FIG. 2.
Figure 4A:
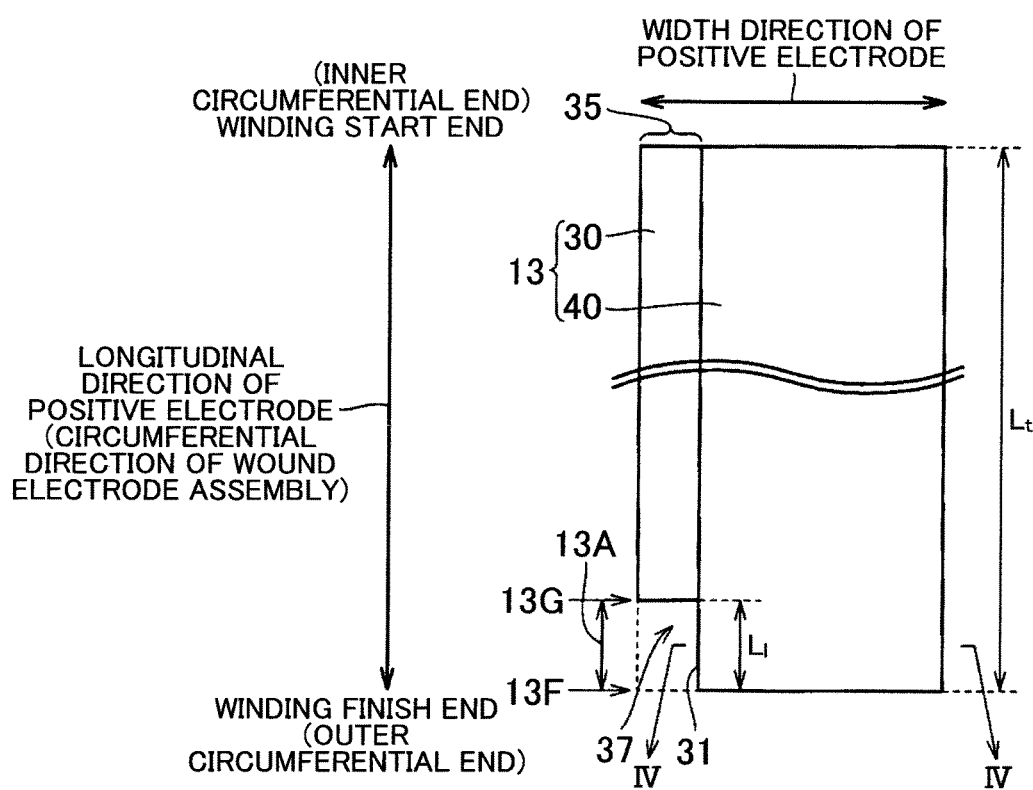
FIG. 4A is a plan view of a positive electrode.

[Structure of Nonaqueous Electrolyte Secondary Battery] FIG. 1 is a perspective view showing a main part of a nonaqueous electrolyte secondary battery of an embodiment of the invention. FIG. 2 is a cross-sectional view showing a main part of a cross section taken along line II-II of FIG. 1. FIG. 3 is a cross-sectional view showing a main part of a cross section taken along line of FIG. 2. FIG. 4A is a plan view of a positive electrode (positive electrode in a non-wound state) and FIGS. 4B and 4C are examples of a cross-sectional view taken along line IV-IV of FIG. 4A.

Figure 4B:
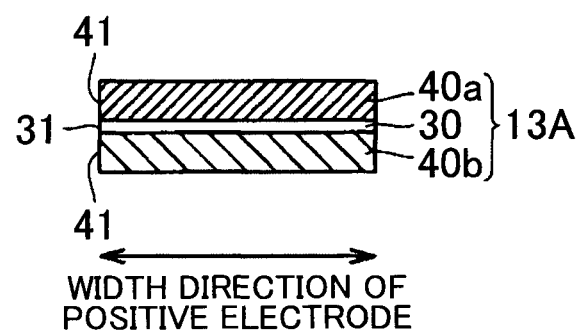
FIGS. 4B and 4C are examples of a cross-sectional view taken along line IV-IV of FIG. 4A.
Figure 4C:
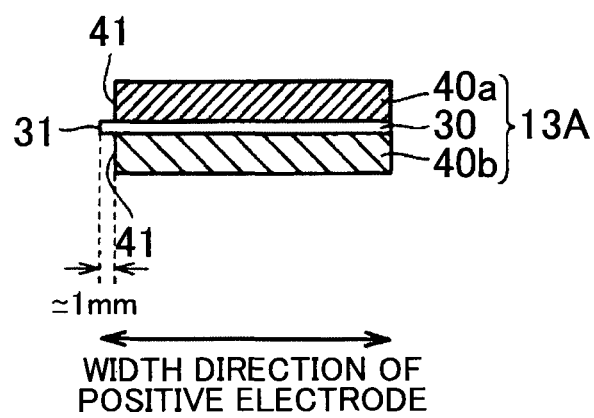

In FIGS. 4A to 4C, there are shown an outermost circumferential portion 13A of a positive electrode 13, an outer circumferential end 13F of the positive electrode 13, and a portion 13G located inward by one turn of the positive electrode 13 from the outer circumferential end 13F of the positive electrode 13. The outer circumferential end 13F of the positive electrode 13 means, of end portions of the positive electrode 13 in a circumferential direction of a wound electrode assembly 11, the end portion located on the outer circumferential side of the wound electrode assembly 11. A later-described inner circumferential end of the positive electrode 13 means, of the end portions of the positive electrode 13 in the circumferential direction of the wound electrode assembly 11, the end portion located on the inner circumferential side of the wound electrode assembly 11. The circumferential direction of the wound electrode assembly 11 corresponds to a longitudinal direction of the positive electrode 13 in a non-wound state and corresponds to a longitudinal direction of a negative electrode 17 in a non-wound state. These also apply to FIG. 6B and FIG. 7 which will be described later.

In the nonaqueous electrolyte secondary battery of this embodiment, the wound electrode assembly 11 and a nonaqueous electrolyte (not shown) are provided in a battery case 1. In the wound electrode assembly 11, the positive electrode 13 and the negative electrode 17 are wound together, with separator 15 interposed therebetween.

The positive electrode 13 includes a positive electrode current collector 30 and positive electrode mixture layers 40. The positive electrode mixture layer 40 is provided on each of both surfaces of the positive electrode current collector 30 in a region except one end in a width direction of the positive electrode 13. The positive electrode 13 has, at its one end in the width direction, a positive electrode exposed portion 35 provided without the positive electrode mixture layer 40 on the positive electrode current collector 30. The positive electrode exposed portion 35 protrudes outward in an axial direction of the wound electrode assembly 11 relative to the separator 15 and the negative electrode 17 at one end in the axial direction of the wound electrode assembly 11 (on the left side in FIG. 3) and is bent toward the inner circumferential side of the wound electrode assembly 11 and connected to a positive electrode terminal 3 provided to the battery case 1.

The negative electrode 17 includes a negative electrode current collector 70 and negative electrode mixture layers 80. The negative electrode mixture layer 80 is provided on each of both surfaces of the negative electrode current collector 70 in a region except one end in a width direction of the negative electrode 17. The negative electrode 17 has, at its one end in the width direction, a negative electrode exposed portion 75 provided without the negative electrode mixture layer 80 on the negative electrode current collector 70. The negative electrode exposed portion 75 protrudes outward in the axial direction of the wound electrode assembly 11 relative to the positive electrode 13 and the separator 15 at the other end in the axial direction of the wound electrode assembly 11 (on the right side in FIG. 3) and is bent toward the inner circumferential side of the wound electrode assembly 11 and connected to a negative electrode terminal 7 provided to the battery case 1.

In the nonaqueous electrolyte secondary battery of this embodiment, the positive electrode exposed portion 35 has a cutout portion 37 at least in the outermost circumferential portion 13A of the positive electrode 13. With this structure, even if the nonaqueous electrolyte secondary battery of this embodiment is stored in a charged state in a high-temperature environment, the performance of the nonaqueous electrolyte secondary battery can be kept high. Hence, it is possible to distribute the nonaqueous electrolyte secondary battery of this embodiment in the market in a charged state. For example, when a vehicular power source is manufactured using the nonaqueous electrolyte secondary battery of this embodiment, a vehicle equipped with the nonaqueous electrolyte secondary battery in a charged state can be distributed in the market. Therefore, after buying the vehicle, a buyer of the vehicle can use the vehicle without charging the nonaqueous electrolyte secondary battery incorporated in the vehicle. Consequently, according to this embodiment, it is possible to boost the convenience of a product into which the nonaqueous electrolyte secondary battery is incorporated. Hereinbelow, the nonaqueous electrolyte secondary battery of this embodiment will be further described, compared to a conventional large nonaqueous electrolyte secondary battery.

In this embodiment, of the positive electrode mixture layers 40 provided in the outermost circumferential portion 13A of the positive electrode 13, the positive electrode mixture layer 40 located on the inner circumferential side of the wound electrode assembly 11 will be referred to as an "inner-circumferential-side positive electrode mixture layer 40a", while the positive electrode mixture layer 40 located on the outer circumferential side of the wound electrode assembly 11 will be referred to as an "outer-circumferential-side positive electrode mixture layer 40b". Further, of the negative electrode mixture layers 80 provided in an outermost circumferential portion 17A of the negative electrode 17, the negative electrode mixture layer 80 located on the inner circumferential side of the wound electrode assembly 11 will be referred to as an "inner-circumferential-side negative electrode mixture layer 80a", while the negative electrode mixture layer 80 located on the outer circumferential side of the wound electrode assembly 11 will be referred to as an "outer-circumferential-side negative electrode mixture layer 80b".

Further, "the outermost circumferential portion 13A of the positive electrode 13" means a portion from the outer circumferential end 13F of the positive electrode 13 to the portion 13G located inward by one turn of the positive electrode 13 from the outer circumferential end 13F of the positive electrode 13 (FIG. 2). Preferably, "the outermost circumferential portion 13A of the positive electrode 13" means a portion located on the outer circumferential end 13F side of the positive electrode 13 from a point proceeding from the outer circumferential end 13F of the positive electrode 13 toward the inner circumferential end of the positive electrode 13 by a distance of 5% of a length $L_t$ of the positive electrode 13 in the circumferential direction of the wound electrode assembly 11. That is, a length $L_1$ of the outermost circumferential portion 13A of the positive electrode 13 is preferably 5% or less of the length $L_t$ of the positive electrode 13. This also applies to "the outermost circumferential portion 17A of the negative electrode 17".

Further, "the length $L_t$ of the positive electrode 13" means a distance between the inner circumferential end of the positive electrode 13 and the outer circumferential end 13F of the positive electrode 13 in the circumferential direction of the wound electrode assembly 11, while "the length $L_1$ of the outermost circumferential portion 13A of the positive electrode 13" means a length of the outermost circumferential portion 13A of the positive electrode 13 in the circumferential direction of the wound electrode assembly 11.

FIG. 5 is a cross-sectional view showing a main part of a wound electrode assembly of a conventional large nonaqueous electrolyte secondary battery. In the wound electrode assembly shown in FIG. 5, a separator 15, an outermost circumferential portion 17A of a negative electrode 17, and a separator 15 are provided in this order on the outer circumferential side of the wound electrode assembly with respect to an outer-circumferential-side positive electrode mixture layer 40b. This time, the nonaqueous electrolyte secondary battery including the wound electrode assembly shown in FIG. 5 was stored in a charged state in a high-temperature environment and, as a result, there were cases where the performance of the nonaqueous electrolyte secondary battery was reduced. The present inventors have intensively investigated a reason for this result and obtained the following knowledge.

When the nonaqueous electrolyte secondary battery including the wound electrode assembly shown in FIG. 5 is charged, lithium ions (Li⁺) contained in the outer-circumferential-side positive electrode mixture layer 40b move to an inner-circumferential-side negative electrode mixture layer 80a through the separator 15. When the charged nonaqueous electrolyte secondary battery is stored in the high-temperature environment, the lithium ions moved to the inner-circumferential-side negative electrode mixture layer 80a tend to diffuse into an outer-circumferential-side negative electrode mixture layer 80b due to a nonaqueous electrolyte (not shown) present at an end portion in a width direction of the negative electrode 17, located on the side opposite to a negative electrode exposed portion 75 (on the left side in FIG. 5). Accordingly, in the outer-circumferential-side positive electrode mixture layer 40b at its end portion in a width direction of a positive electrode 13, located on the side opposite to the side where the negative electrode exposed portion 75 is provided (on the left side in FIG. 5), the lithium ions are extracted not only into the inner-circumferential-side negative electrode mixture layer 80a but also into the outer-circumferential-side negative electrode mixture layer 80b so that the extraction of the lithium ions becomes significant. As a result, the potential of the positive electrode 13 becomes high (e.g. the potential of the positive electrode 13 increases to 4.25V or more (vs. Li/Li⁺)).

At a portion where the potential of the positive electrode 13 is high, a metal forming a positive electrode active material tends to dissolve into the nonaqueous electrolyte from the positive electrode active material. Here, the potential of the negative electrode 17 is lower than that of the positive electrode 13. Therefore, metal ions dissolved into the nonaqueous electrolyte tend to be reduced at the negative electrode 17. Since the self-discharge tends to occur due to this reduction, the performance of the nonaqueous electrolyte secondary battery is reduced.

From the knowledge described above, the present inventors have first considered that the self-discharge can be prevented if it is possible to prevent the diffusion of the lithium ions into the outer-circumferential-side negative electrode mixture layer 80b. For example, if the outer-circumferential-side negative electrode mixture layer 80b is not provided, it is possible to prevent the diffusion of the lithium ions into the outer-circumferential-side negative electrode mixture layer 80b. However, since the number of turns of the electrodes is large in the wound electrode assembly included in the large nonaqueous electrolyte secondary battery, it is difficult to specify a portion that will serve as the outermost circumferential portion 17A, in the negative electrode 17 before winding (the beltlike negative electrode 17). Therefore, there is a possibility that the outer-circumferential-side negative electrode mixture layer 80b may be provided and, as a result, there is a possibility that the lithium ions may diffuse into the outer-circumferential-side negative electrode mixture layer 80b.

If the outer-circumferential-side negative electrode mixture layer 80b is stripped from a negative electrode current collector 70 after fabricating the wound electrode assembly 11, it is possible to solve such a problem that the outer-circumferential-side negative electrode mixture layer 80b may possibly be provided. However, if the negative electrode current collector 70 is damaged when stripping the outer-circumferential-side negative electrode mixture layer 80b, a reduction in the performance of the nonaqueous electrolyte secondary battery is brought about.

On the other hand, if a tape is attached to the outer-circumferential-side negative electrode mixture layer 80b after fabricating the wound electrode assembly 11, it is possible to prevent the diffusion of the lithium ions into the outer-circumferential-side negative electrode mixture layer 80*b*. However, the thickness of the positive electrode 13 or the negative electrode 17 should be reduced by the thickness of the tape. Therefore, a reduction in energy density per unit volume of the nonaqueous electrolyte secondary battery may be brought about. From the above, the present inventors have considered that it is difficult to prevent the diffusion of the lithium ions into the outer-circumferential-side negative electrode mixture layer 80*b*.

Next, the present inventors have considered that the self-discharge can be prevented if it is possible to prevent the potential of the positive electrode 13 from becoming locally high in an outermost circumferential portion 13A of the positive electrode 13, and have intensively investigated such a technique. As a result, the present inventors have reached a structure that a cutout portion is formed in a positive electrode exposed portion at least in the outermost circumferential portion of the positive electrode.

That is, in this embodiment, the positive electrode exposed portion 35 has the cutout portion 37 at least in the outermost circumferential portion 13A of the positive electrode 13. With this structure, it is possible to prevent that the movement of lithium ions from the inner-circumferential-side positive electrode mixture layer 40*a* to the inner-circumferential-side negative electrode mixture layer 80*a* or the outer-circumferential-side negative electrode mixture layer 80*b* is precluded by the positive electrode exposed portion 35 (FIG. 3). Accordingly, it is possible to prevent that the potential of the positive electrode 13 becomes high in the outer-circumferential-side positive electrode mixture layer 40*b* at its end portion in the width direction of the positive electrode 13, located on the side opposite to the side where the negative electrode exposed portion 75 is provided (on the left side in FIG. 3). Therefore, it is possible to prevent a metal forming a positive electrode active material from dissolving into the nonaqueous electrolyte from the positive electrode active material so that it is possible to prevent the occurrence of a reduction reaction at the negative electrode 17. As a result, even if the nonaqueous electrolyte secondary battery of this embodiment is stored in a charged state in a high-temperature environment, the performance of the nonaqueous electrolyte secondary battery can be kept high.

In addition, since the positive electrode exposed portion 35 has the cutout portion 37 at least in the outermost circumferential portion 13A of the positive electrode 13, it is possible to ensure a connection area between the positive electrode exposed portion 35 and the positive electrode terminal 3. Accordingly, since the connection resistance between the positive electrode exposed portion 35 and the positive electrode terminal 3 can be suppressed to be low, the I-V resistance of the nonaqueous electrolyte secondary battery can be suppressed to be low. In order to effectively obtain this effect, it is preferable that the positive electrode exposed portion 35 have the cutout portion 37 only in the outermost circumferential portion 13A of the positive electrode 13. Hereinbelow, the respective components of the nonaqueous electrolyte secondary battery will be described.

<Positive Electrode>

(Cutout Portion) "the cutout portion 37" means a portion that is preferably formed by completely removing the positive electrode exposed portion 35. However, the positive electrode exposed portion 35 may partially remain without being removed in the cutout portion 37. In this case, it is possible to prevent solid contents, such as a positive electrode active material, a conductive agent, and a binder, contained in the positive electrode mixture layer from coming off the positive electrode mixture layer.

For example, in the cutout portion 37, an end face 31 of the positive electrode current collector 30 is preferably flush with end faces 41 of the positive electrode mixture layers 40 (FIG. 4B). With this structure, it is possible to effectively prevent that the movement of the lithium ions from the inner-circumferential-side positive electrode mixture layer 40*a* to the inner-circumferential-side negative electrode mixture layer 80*a* or the outer-circumferential-side negative electrode mixture layer 80*b* is precluded by the positive electrode exposed portion 35. However, even if an end face 31 of the positive electrode current collector 30 protrudes slightly (e.g. about 1 mm) outward in the width direction of the positive electrode 13 than end faces 41 of the positive electrode mixture layers 40 (FIG. 4C), it is possible to prevent that the movement of the lithium ions from the inner-circumferential-side positive electrode mixture layer 40*a* to the inner-circumferential-side negative electrode mixture layer 80*a* or the outer-circumferential-side negative electrode mixture layer 80*b* is precluded by the positive electrode exposed portion 35.

Alternatively, in the cutout portion 37, the positive electrode exposed portion 35 may be formed with one or more through holes. In this case, the lithium ions move from the inner-circumferential-side positive electrode mixture layer 40*a* to the inner-circumferential-side negative electrode mixture layer 80*a* or the outer-circumferential-side negative electrode mixture layer 80*b* through the through hole/holes described above. Accordingly, it is possible to prevent that the movement of the lithium ions from the inner-circumferential-side positive electrode mixture layer 40*a* to the inner-circumferential-side negative electrode mixture layer 80*a* or the outer-circumferential-side negative electrode mixture layer 80*b* is precluded by the positive electrode exposed portion 35.

There are cases where the length $L_1$ of the outermost circumferential portion 13A of the positive electrode 13 differs from its designed length depending on the winding state of the wound electrode assembly 11. In order to obtain the above-described effect (the effect that even if the nonaqueous electrolyte secondary battery is stored in a charged state in a high-temperature environment, the performance of the nonaqueous electrolyte secondary battery can be kept high) even in such cases, the positive electrode exposed portion 35 preferably has the cutout portion 37 at a portion located on the outer circumferential end 13F side of the positive electrode 13 from a point proceeding from the outer circumferential end 13F of the positive electrode 13 toward the inner circumferential end of the positive electrode 13 by a distance of 10% of the length $L_t$ of the positive electrode 13 in the circumferential direction of the wound electrode assembly 11. Accordingly, "the positive electrode exposed portion 35 has the cutout portion 37 at least in the outermost circumferential portion 13A of the positive electrode 13" means that the positive electrode exposed portion 35 has the cutout portion 37 at a portion located on the outer circumferential end 13F side of the positive electrode 13 from a point proceeding from the outer circumferential end 13F of the positive electrode 13 toward the inner circumferential end of the positive electrode 13 by a distance of 10% of the length $L_t$ of the positive electrode 13 in the circumferential direction of the wound electrode assembly 11. That is, the length of the cutout portion 37 in the circumferential direction of the wound electrode assembly 11 is preferably 10% or less of the length $L_t$ of the positive electrode 13. The length of the cutout portion 37 may be 5% or less of the length $L_t$ of the positive electrode 13.

(Positive Electrode Current Collector) The positive electrode current collector 30 preferably has a structure conventionally known as a positive electrode current collector of a nonaqueous electrolyte secondary battery and is, for example, an aluminum foil having a thickness of 5 µm or more and 50 µm or less.

(Positive Electrode Mixture Layer) The positive electrode mixture layer 40 preferably contains a positive electrode active material, a conductive agent, and a binder. The positive electrode active material is preferably made of a material conventionally known as a positive electrode active material of a nonaqueous electrolyte secondary battery. For example, as the positive electrode active material, it is possible to use a compound expressed by a general formula $LiNi_aCo_bMn_cO_2$ (0<a<1, 0<b<1, 0<c<1, a+b+e=1), a compound expressed by a general formula $LiNi_aCo_bMn_cO_2$ where Ni composition a is large, a compound expressed by a general formula $Li(Ni_dCo_eAl_f)O_2$ (0<d<1, 0<e<1, 0<f<1, d+e+f=1), a lithium composite oxide having an olivine crystal structure (e.g. a compound expressed by a general formula $Li_xFePO_4$ (0≤x<1)), a lithium composite oxide having a spinel crystal structure (e.g. a compound expressed by a general formula $Li_yMn_2O_4$ (0≤y<1)), or the like. These may be used alone or as a mixture of two or more kinds. The lithium composite oxide means an oxide containing lithium element and one or more kinds of transition metal elements.

The conductive agent is preferably made of a material conventionally known as a conductive agent contained in a positive electrode mixture layer of a nonaqueous electrolyte secondary battery and is, for example, preferably a carbon material such as acetylene black.

The binder is preferably made of a material conventionally known as a binder contained in a positive electrode mixture layer of a nonaqueous electrolyte secondary battery and is, for example, preferably PVdF (polyvinylidene difluoride).

The content of the positive electrode active material, the content of the conductive agent, and the content of the binder in the positive electrode mixture layer 40 are, respectively, preferably the contents conventionally known as the content of a positive electrode active material, the content of a conductive agent, and the content of a binder in a positive electrode mixture layer of a nonaqueous electrolyte secondary battery. For example, the positive electrode mixture layer 40 contains the positive electrode active material in an amount of 80 mass % or more and 95 mass % or less, the conductive agent in an amount of 3 mass % or more and 15 mass % or less, and the binder in an amount of 2 mass % or more and 5 mass % or less.

<Negative Electrode> The negative electrode current collector 70 preferably has a structure conventionally known as a negative electrode current collector of a nonaqueous electrolyte secondary battery and is, for example, a copper foil having a thickness of 5 µm or more and 50 µm or less.

The negative electrode mixture layer 80 preferably contains a negative electrode active material and a binder. The negative electrode active material is preferably made of a material conventionally known as a negative electrode active material of a nonaqueous electrolyte secondary battery. For example, as the negative electrode active material, it is possible to use a material containing natural graphite as a core material, soft carbon, hard carbon, lithium titanate, or the like. As the material containing natural graphite as a core material, it is possible to use, for example, a material obtained by applying a spheroidizing treatment to a carbon material formed by coating carbon on the surface of natural graphite.

The binder is preferably made of a material conventionally known as a binder contained in a negative electrode mixture layer of a nonaqueous electrolyte secondary battery and is, for example, preferably SBR (styrene-butadiene rubber).

The content of the negative electrode active material and the content of the binder in the negative electrode mixture layer 80 are, respectively, preferably the contents conventionally known as the content of a negative electrode active material and the content of a binder in a negative electrode mixture layer of a nonaqueous electrolyte secondary battery. For example, the negative electrode mixture layer 80 contains the negative electrode active material in an amount of 80 mass % or more and 95 mass % or less and the binder in an amount of 5 mass % or more and 20 mass % or less.

<Separator> The separator 15 preferably has a structure conventionally known as a separator of a nonaqueous electrolyte secondary battery. For example, the separator 15 may be a resin layer made of a porous polyolefin-based resin (e.g. polypropylene) or may further include a heat-resistant layer.

<Nonaqueous Electrolyte> The nonaqueous electrolyte preferably has a structure conventionally known as a nonaqueous electrolyte of a nonaqueous electrolyte secondary battery. For example, the nonaqueous electrolyte preferably contains one or more kinds of organic solvents and one or more kinds of lithium salts and more preferably further contains an overcharge inhibitor.

Figure 6A:
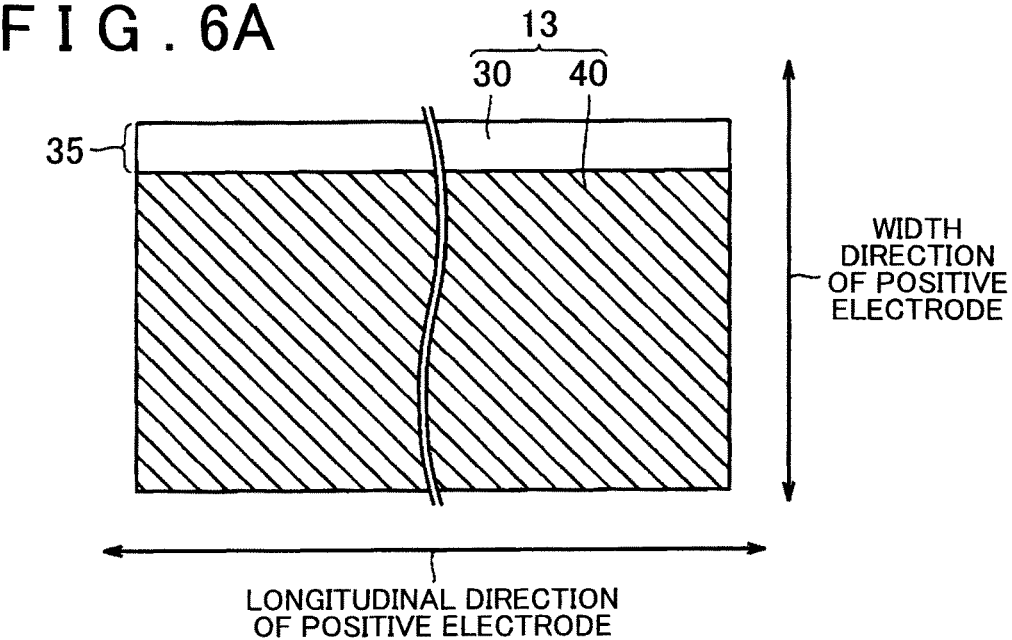
FIGS. 6A and 6B are plan views each showing part of a manufacturing method of the positive electrode of the embodiment of the invention.
Figure 6B:
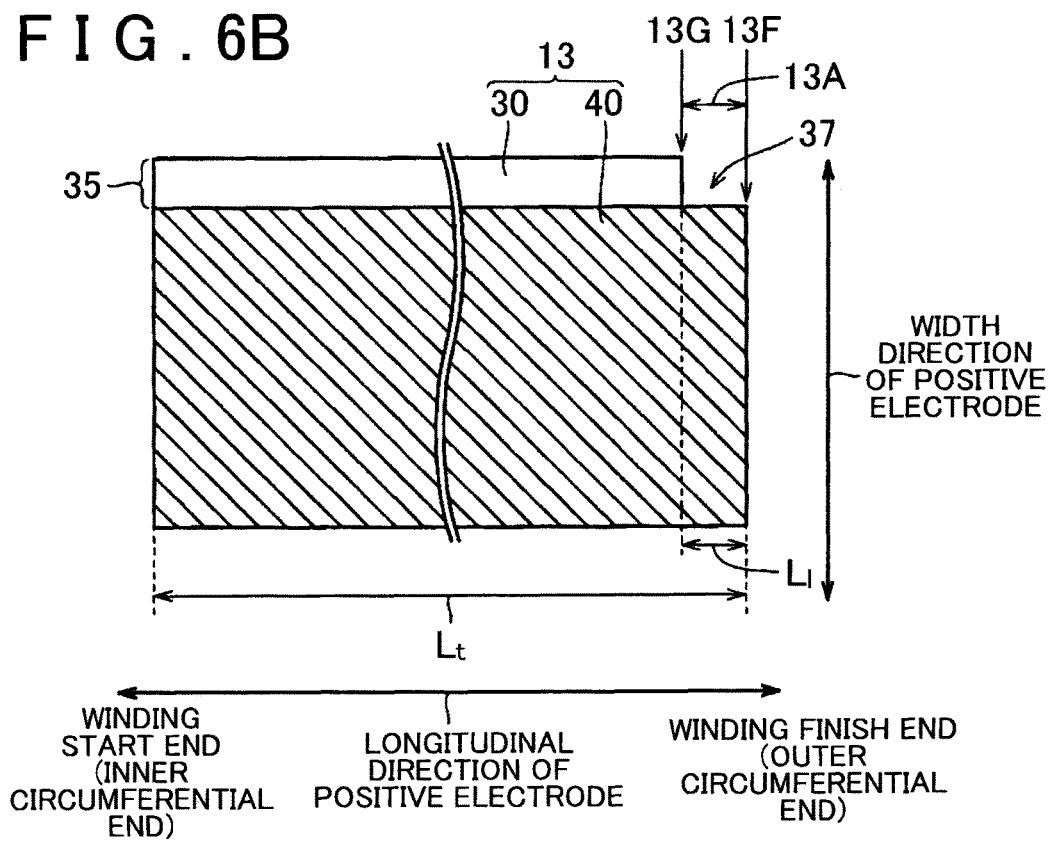

[Manufacture of Nonaqueous Electrolyte Secondary Battery] FIGS. 6A and 6B are plan views each showing part of a manufacturing method of the positive electrode of this embodiment. FIG. 7 is a plan view showing a process of a manufacturing method of the nonaqueous electrolyte secondary battery of this embodiment. The manufacturing method of the nonaqueous electrolyte secondary battery of this embodiment includes a process of preparing the positive electrode 13, a process of preparing the negative electrode 17, and a process of fabricating the wound electrode assembly 11.

<Preparation of Positive Electrode> For example, the positive electrode 13 can be produced according to the following method. First, the positive electrode current collector 30 rectangular in plan view is prepared and then the positive electrode mixture layer 40 is formed on each surface of the positive electrode current collector 30 in a region except one end in a width direction of the positive electrode current collector 30. Here, the width direction of the positive electrode current collector 30 is parallel to the width direction of the positive electrode 13.

A forming method of the positive electrode mixture layer 40 is not particularly limited. A positive electrode mixture paste containing the positive electrode active material, the conductive agent, and the binder may be applied to the region except the one end in the width direction of the positive electrode current collector 30 and then dried. Alternatively, wet granulated particles containing the positive electrode active material, the conductive agent, and the binder may be pressure-bonded to the region except the one end in the width direction of the positive electrode current collector 30 and then dried. The positive electrode current collector 30 rectangular in plan view is not formed with the cutout portion 37. Therefore, in the formed electrode, the positive electrode exposed portion 35 is continuously formed from one end in the longitudinal direction of the positive electrode 13 to the other end thereof (FIG. 6A).

Then, the cutout portion 37 is formed in the positive electrode exposed portion 35 on the one end side in the longitudinal direction of the positive electrode 13 (FIG. 6B). Preferably, the cutout portion 37 is formed in the positive electrode exposed portion 35 at a portion located on the one end side in the longitudinal direction of the positive electrode 13 from a point proceeding from the one end in the longitudinal direction of the positive electrode 13 toward the other end in the longitudinal direction of the positive electrode 13 by a distance of 10% of the length $L_t$ of the positive electrode 13 in the longitudinal direction of the positive electrode 13. More preferably, the cutout portion 37 is formed in the positive electrode exposed portion 35 at a portion located on the one end side in the longitudinal direction of the positive electrode 13 from a point proceeding from the one end in the longitudinal direction of the positive electrode 13 toward the other end in the longitudinal direction of the positive electrode 13 by a distance of 5% of the length $L_t$ of the positive electrode 13 in the longitudinal direction of the positive electrode 13.

A forming method of the cutout portion 37 is not particularly limited. For example, the cutout portion 37 can be formed by cutting off the positive electrode exposed portion 35 on the one end side in the longitudinal direction of the positive electrode 13 using a cutter capable of cutting the positive electrode current collector 30. In this way, the positive electrode 13 is obtained.

The cutout portion 37 may be formed after fabricating the wound electrode assembly 11 (later-described Example), but the time required for forming the cutout portion 37 can be shortened by forming the cutout portion 37 before fabricating the wound electrode assembly 11. Therefore, it is preferable to fabricate the wound electrode assembly 11 using the positive electrode 13 formed with the cutout portion 37.

<Preparation of Negative Electrode> For example, the negative electrode 17 can be produced according to the following method. First, the negative electrode current collector 70 rectangular in plan view is prepared and then the negative electrode mixture layer 80 is formed on each surface of the negative electrode current collector 70 in a region except one end in a width direction of the negative electrode current collector 70. A forming method of the negative electrode mixture layer 80 is not particularly limited. A negative electrode mixture paste containing the negative electrode active material and the binder may be applied to the region except the one end in the width direction of the negative electrode current collector 70 and then dried. Alternatively, wet granulated particles containing the negative electrode active material and the binder may be pressure-bonded to the region except the one end in the width direction of the negative electrode current collector 70 and then dried. In this way, the negative electrode 17 is obtained. Here, the width direction of the negative electrode current collector 70 is parallel to the width direction of the negative electrode 17.

<Fabrication of Wound Electrode Assembly> The positive electrode 13 and the negative electrode 17 are wound together, with the separator 15 interposed therebetween. In this way, the wound electrode assembly 11 is obtained. Specifically, first, the separator 15 is placed between the positive electrode 13 and the negative electrode 17. In this event, the positive electrode 13, the negative electrode 17, and the separator 15 are disposed in such a way that the positive electrode exposed portion 35 and the negative electrode exposed portion 75 protrude relative to the separator 15 in mutually opposite directions in the width direction of the positive electrode 13 (or in the width direction of the negative electrode 17) (FIG. 7).

Then, a winding shaft is disposed so as to be parallel to the width direction of the positive electrode 13 and, using this winding shaft, the positive electrode 13, the negative electrode 17, and the separator 15 are wound together. In this event, the positive electrode 13, the negative electrode 17, and the separator 15 are wound together in such a way that, of the longitudinal end portions of the positive electrode 13, the end portion formed with the cutout portion 37 serves as a winding finish end, while the end portion located on the side opposite to the end portion side formed with the cutout portion 37 serves as a winding start end (FIG. 7). Consequently, of the longitudinal end portions of the positive electrode 13, the end portion formed with the cutout portion 37 serves as the outer circumferential end 13F of the positive electrode 13, while the end portion located on the side opposite to the end portion side formed with the cutout portion 37 serves as the inner circumferential end of the positive electrode 13. The cutout portion 37 is located in the outermost circumferential portion 13A of the positive electrode 13. Pressures in mutually opposite directions may be applied to the electrode assembly thus obtained.

<Sealing> The positive electrode terminal 3 provided to a lid of the battery case 1 is connected to the positive electrode exposed portion 35, while the negative electrode terminal 7 provided to the lid of the battery case 1 is connected to the negative electrode exposed portion 75. Accordingly, the lid is connected to the wound electrode assembly 11. Thereafter, the wound electrode assembly 11 is placed in a recessed portion of a case body of the battery case 1 and then an opening of the case body is sealed by the lid.

The nonaqueous electrolyte is supplied to the recessed portion of the case body through an electrolyte injection hole formed in the case body or the lid. After reducing the pressure in the battery case 1 as needed, the electrolyte injection hole is sealed. In this way, the nonaqueous electrolyte secondary battery of this embodiment is manufactured.

Hereinbelow, the invention will be described in more detail with reference to an Example, but the invention is not limited to the following.

Example 1

(Production of Positive Electrode) A $LiNi_{1/3}Co_{1/3}Mn_{1/3}O_2$ powder was prepared as a positive electrode active material. The positive electrode active material, acetylene black, and PVdF were mixed in a mass ratio of 90:8:2 and diluted with NMP (N-methylpyrrolidone). In this way, a positive electrode mixture paste was obtained.

The positive electrode mixture paste was applied to both surfaces of an Al foil (positive electrode current collector) in such a way that one end in a width direction of the Al foil was exposed, and then dried. The obtained electrode plate was rolled to obtain a positive electrode. That is, in the positive electrode, a positive electrode mixture layer was formed on each of both surfaces of the Al foil in a region except the one end in the width direction of the Al foil.

(Production of Negative Electrode) A material containing natural graphite as a core material (a material obtained by applying a spheroidizing treatment to a carbon material formed by coating carbon on the surface of natural graphite) was prepared as a negative electrode active material. The negative electrode active material, a sodium salt of CMC (carboxymethylcellulose) (a thickener), and SBR (binder)

were mixed in a mass ratio of 98:1:1 and diluted with water. In this way, a negative electrode mixture paste was obtained.

The negative electrode mixture paste was applied to both surfaces of a Cu foil (negative electrode current collector) in such a way that one end in a width direction of the Cu foil was exposed, and then dried. The obtained electrode plate was rolled to obtain a negative electrode. That is, in the negative electrode, a negative electrode mixture layer was formed on each of both surfaces of the Cu foil in a region except the one end in the width direction of the Cu foil.

(Fabrication and Insertion of Wound Electrode Assembly) Separators each formed by laminating a PE (polyethylene) layer, a PP (polypropylene) layer, and a PE layer in this order were prepared. The positive electrode, the negative electrode, and the separator were disposed in such a way that a portion (positive electrode exposed portion) where the Al foil was exposed from the positive electrode mixture layers and a portion (negative electrode exposed portion) where the Cu foil was exposed from the negative electrode mixture layers protruded relative to the separator in mutually opposite directions in the width direction of the Al foil. Thereafter, a winding shaft was disposed so as to be parallel to the width direction of the Al foil and, using this winding shaft, the positive electrode, the negative electrode, and the separator were wound together. After a portion serving as an outermost circumferential portion of the positive electrode became clear, the positive electrode exposed portion was completely cut off at the portion serving as the outermost circumferential portion of the positive electrode (formation of a cutout portion). Pressures in mutually opposite directions were applied to the obtained wound electrode assembly (cylindrical electrode assembly), thereby obtaining a flat wound electrode assembly.

A positive electrode terminal provided to a lid of a battery case was connected to the positive electrode exposed portion, while a negative electrode terminal provided to the lid of the battery case was connected to the negative electrode exposed portion. Accordingly, the lid was connected to the flat wound electrode assembly. Thereafter, the flat wound electrode assembly was covered with a packing material made of PE and then was placed in a recessed portion of a case body of the battery case, and then an opening of the case body was sealed by the lid.

(Preparation and Injection of Nonaqueous Electrolyte) EC (ethylene carbonate), DMC (dimethyl carbonate), and EMC (ethylmethyl carbonate) were mixed in a volume ratio of 3:4:3. $LiPF_6$ was added to the mixed solvent thus obtained, thereby obtaining a nonaqueous electrolyte. In the obtained nonaqueous electrolyte, the concentration of $LiPF_6$ was 1.0 mol/L.

The obtained nonaqueous electrolyte was injected to the recessed portion of the case body through an electrolyte injection hole formed in the lid. After reducing the pressure in the battery case, the electrolyte injection hole was sealed. In this way, a lithium-ion secondary battery (rated capacity: 30 Ah) of this Example was manufactured.

(Measurement of Initial Discharge Capacity) At 25° C., the lithium-ion secondary battery of this Example was CC-CV (Constant Current-Constant Voltage) charged with a current of 21 A (0.7 C) to a battery voltage of 4.1V (cut off in 2 hours) and then was CC-CV discharged with a current of 15 A (0.5 C) to a battery voltage of 3.0V (cut off in 4 hours). The discharge capacity when this CC-CV discharge was carried out was given as an initial discharge capacity.

(Calculation of Decrease Rate of SOC) After measuring the initial discharge capacity, the lithium-ion secondary battery was charged. In this charging, the lithium-ion secondary battery was CC-CV charged with a current of 21 A (0.7 C) to a battery voltage of 4.3V (cut off in 3 hours). This lithium-ion secondary battery was stored at 80° C. for 3 days and then the discharge capacity (discharge capacity after the storage) was measured according to the measuring method of the initial discharge capacity.

Thereafter, the lithium-ion secondary battery was charged. In this charging, the lithium-ion secondary battery was CC-CV charged with a current of 21 A (0.7 C) to a battery voltage of 4.1V (cut off in 2 hours). The lithium-ion secondary battery thus in a fully charged state was left at 25° C. for 100 days. The discharge capacity (remaining capacity) of this lithium-ion secondary battery was measured according to the measuring method of the initial discharge capacity. The measured initial discharge capacity, discharge capacity after the storage, and remaining capacity were substituted in the following equation 1, thereby calculating a decrease rate of SOC. The result is shown in Table 1.

(Decrease Rate of SOC)={(Discharge Capacity after Storage)−(Remaining Capacity)}/(Initial Discharge Capacity)   Equation 1

TABLE 1

| | Decrease rate of SOC | I-V Resistance (mΩ) |
|---|---|---|
| Example 1 | 2.7 | 1.12 |
| Comparative Example 1 | 6.6 | 1.12 |

(Measurement of I-V Resistance) The SOC (state of charge) of the lithium-ion secondary battery was adjusted to a state of 60% by charging. Thereafter, the lithium-ion secondary battery was discharged with a current of 200 A for 10 seconds at 25° C. The voltage change amount (ΔV) across this discharge was measured and then the measured ΔV was divided by the above current value to obtain an "I-V resistance". The result is shown in Table 1.

Comparative Example 1

A lithium-ion secondary battery was manufactured according to the method described in Example 1 except that a positive electrode exposed portion was not cut off (a cutout portion was not formed) at a portion serving as an outermost circumferential portion of a positive electrode. Calculation of a decrease rate of SOC and measurement of an I-V resistance were carried out for the obtained lithium-ion secondary battery according to the method described in Example 1. The results are shown in Table 1.

<Consideration> In Example 1, the decrease rate of SOC was smaller than that in Comparative Example 1. From this, it is considered that the self-discharge is prevented in Example 1 compared to Comparative Example 1. The reason for this is considered that the potential of the positive electrode was prevented from becoming locally high in the outermost circumferential portion of the positive electrode. This has been confirmed by the present inventors.

The present inventors manufactured a simulated lithium-ion secondary battery of Example 1 according to the method described in Example 1 except that the lengths of a positive electrode, a negative electrode, and separator were short, and then charged the manufactured lithium-ion secondary battery. The positive electrode was taken out from the charged lithium-ion secondary battery and the potential of a portion, located near a cutout portion, of an outermost circumferential portion of the positive electrode was measured. Likewise, the present inventors manufactured a simulated lithium-ion secondary battery of Comparative Example 1 according to the method described in Comparative Example 1 except that the lengths of a positive electrode, a negative electrode, and separator were short, and then charged the manufactured lithium-ion secondary battery. The positive electrode was taken out from the charged lithium-ion secondary battery and the potential of a portion, located near a positive electrode exposed portion, of an outermost circumferential portion of the positive electrode was measured. As a result, the potential was reduced by about 50 mV in the simulated lithium-ion secondary battery of Example 1 compared to the simulated lithium-ion secondary battery of Comparative Example 1.

The I-V resistances were the same in Example 1 and Comparative Example 1. That is, in Example 1, although the cutout portion was formed in the positive electrode exposed portion, the resistance between the positive electrode exposed portion and the positive electrode terminal was suppressed to be low. The reason for this is considered that the cutout portion was formed only at the portion, located in the outermost circumferential portion of the positive electrode, of the positive electrode exposed portion.

It should be considered that the embodiment and the Example disclosed herein are for illustrative purposes only and are not to be taken by way of limitation in any aspect.

The invention claimed is:

1. A nonaqueous electrolyte secondary battery comprising:
    a wound electrode assembly in which a positive electrode having, at one end in a width direction of the positive electrode, a positive electrode exposed portion provided without a positive electrode mixture layer on a positive electrode current collector and a negative electrode having, at one end in a width direction of the negative electrode, a negative electrode exposed portion provided without a negative electrode mixture layer on a negative electrode current collector are wound together, with a separator interposed therebetween,
    wherein the positive electrode exposed portion protrudes outward in an axial direction of the wound electrode assembly relative to the separator and the negative electrode at one end in the axial direction of the wound electrode assembly,
    the negative electrode exposed portion protrudes outward in the axial direction of the wound electrode assembly relative to the separator and the positive electrode at the other end in the axial direction of the wound electrode assembly, and
    the positive electrode exposed portion has a cutout portion only in an outermost circumferential portion of the positive electrode of the wound electrode assembly, wherein, in longitudinal end portions of the positive electrode, an end portion with the cutout portion serves as a winding finish end, wherein
        the outermost circumferential portion is a portion from an outer circumferential end of the positive electrode to the portion located inward by one turn of the positive electrode from the outer circumferential end of the positive electrode.

2. The nonaqueous electrolyte secondary battery according to claim 1, wherein
    a length of the cutout portion in a circumferential direction of the wound electrode assembly is 10% or less of a length of the positive electrode.

3. The nonaqueous electrolyte secondary battery according to claim 2, wherein
    the length of the cutout portion in a circumferential direction of the wound electrode assembly is 5% or less of a length of the positive electrode.

4. The nonaqueous electrolyte secondary battery according to claim 1, wherein
    each of the positive and negative electrodes is wound in 20 turns or more and 50 turns or less in the wound electrode assembly.

5. The nonaqueous electrolyte secondary battery according to claim 1, wherein
    a length of a portion from the outer circumferential end of the positive electrode to a portion located inward by one turn of the positive electrode from the outer circumferential end is 5% or less of the length of the positive electrode in the circumferential direction of the wound electrode assembly.

6. The nonaqueous electrolyte secondary battery according to claim 1, wherein
    in the cutout portion, an end face of the positive electrode current collector is flush with end faces of the positive electrode mixture layer on each side of the positive electrode current collector.

7. A method of manufacturing a nonaqueous electrolyte secondary battery according to claim 1, comprising:
    a step of preparing a positive electrode having, at one end in a width direction of the positive electrode, a positive electrode exposed portion provided without a positive electrode mixture layer on a positive electrode current collector;
    a step of preparing a negative electrode having, at one end in a width direction of the negative electrode, a negative electrode exposed portion provided without a negative electrode mixture layer on a negative electrode current collector; and
    a step of fabricating a wound electrode assembly by winding together the positive electrode and the negative electrode with a separator interposed therebetween,
    wherein the step of preparing the positive electrode includes a step of forming a cutout portion in the positive electrode exposed portion on one end side in a longitudinal direction of the positive electrode, and
    the step of fabricating the wound electrode assembly includes a step of disposing the positive electrode, the negative electrode, and the separator in such a way that the positive electrode exposed portion and the negative electrode exposed portion protrude relative to the separator in mutually opposite directions in the width direction of the positive electrode, and a step of winding together the positive electrode, the negative electrode, and the separator in such a way that the one end side in the longitudinal direction of the positive electrode, where the cutout portion is formed, serves as a winding finish end, while the other end side in the longitudinal direction of the positive electrode serves as a winding start end.

* * * * *